(12) United States Patent
Tilbrook et al.

(10) Patent No.: US 7,972,686 B2
(45) Date of Patent: *Jul. 5, 2011

(54) COMPOSITE MATERIALS WITH IMPROVED PERFORMANCE

(75) Inventors: David Tilbrook, Saffron (GB); Dana Blair, Hardwick (GB); Maureen Boyle, Castro Valley, CA (US); Paul Mackenzie, Purley (GB)

(73) Assignees: Hexcel Composites, Ltd., Duxford (GB); Hexcel Corporation, Dublin, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/441,398

(22) PCT Filed: Oct. 2, 2007

(86) PCT No.: PCT/GB2007/003741
§ 371 (c)(1),
(2), (4) Date: Mar. 16, 2009

(87) PCT Pub. No.: WO2008/040963
PCT Pub. Date: Apr. 10, 2008

(65) Prior Publication Data
US 2009/0311535 A1  Dec. 17, 2009

(30) Foreign Application Priority Data

Oct. 2, 2006 (GB) .................................. 0619401.3

(51) Int. Cl.
| B32B 27/04 | (2006.01) |
| B32B 27/18 | (2006.01) |
| B32B 27/34 | (2006.01) |
| B32B 27/38 | (2006.01) |
| C08L 63/00 | (2006.01) |
| C08L 63/02 | (2006.01) |

(52) U.S. Cl. ...................... 428/297.4; 428/413; 428/415; 428/417; 523/400; 525/523; 525/524; 525/525; 525/526

(58) Field of Classification Search .................. None
See application file for complete search history.

(56) References Cited

U.S. PATENT DOCUMENTS

| 4,539,253 A | 9/1985 | Hirschbuehler et al. |
| 4,604,319 A | 8/1986 | Evans et al. |
| 4,608,404 A | 8/1986 | Gardner et al. |
| 4,957,801 A | 9/1990 | Maranci et al. |
| 5,028,478 A | 7/1991 | Odagiri et al. |
| 5,268,223 A | 12/1993 | Qureshi |
| 5,317,068 A | 5/1994 | Watanabe et al. |
| 5,599,629 A | 2/1997 | Gardner et al. |
| 5,972,810 A | 10/1999 | Gabrisch et al. |
| 5,985,431 A | 11/1999 | Oosedo et al. |
| 6,045,898 A | 4/2000 | Kishi et al. |
| 6,287,696 B1 | 9/2001 | Noda et al. |
| 6,429,157 B1 | 8/2002 | Kishi et al. |
| 6,440,257 B1 | 8/2002 | Zhou et al. |
| 6,444,187 B1 | 9/2002 | Miyoshi et al. |
| 6,508,910 B2 | 1/2003 | Zhou et al. |
| 6,515,081 B2 | 2/2003 | Oosedo et al. |
| 2008/0081170 A1* | 4/2008 | Tilbrook et al. ........... 428/292.1 |
| 2008/0286578 A1* | 11/2008 | Tilbrook et al. .............. 428/413 |

FOREIGN PATENT DOCUMENTS

| EP | 0326177 A2 | 8/1989 |
| EP | 0392348 A3 | 10/1990 |
| EP | 0411834 | 2/1991 |
| EP | 0745640 A | 12/1996 |
| EP | 0819723 A1 | 8/1997 |
| JP | 61246228 A | 11/1986 |
| JP | 63305124 A | 12/1988 |
| JP | 06009752 | 1/1994 |
| JP | 2005105151 A | 4/2005 |
| WO | WO 97/024398 A | 7/1997 |
| WO | WO 2005/113652 A2 | 12/2005 |
| WO | WO 2008/040963 A | 4/2008 |

* cited by examiner

Primary Examiner — Michael J Feely
(74) Attorney, Agent, or Firm — W. Mark Bielawski; David J. Oldenkamp

(57) ABSTRACT

A composite material comprising at least one polymeric resin and optionally at least one fibrous reinforcement, where the polymeric resin comprises; at least one difunctional epoxy resin; and at least one epoxy resin with a functionality greater than two having at least one meta-substituted phenyl ring in its backbone.

14 Claims, No Drawings

COMPOSITE MATERIALS WITH IMPROVED PERFORMANCE

The present invention relates to composite materials with improved performance, and particularly, but not exclusively, to fibre reinforced composite materials.

Pre-impregnated (prepreg) composite materials based on fibre-reinforcements comprise two primary constituents; a continuous matrix, and reinforcing fibres. The composite materials are often required to perform in demanding environments, such as in the field of aerospace, and therefore physical limits and characteristics of the composite are of critical importance. In particular, when determining how light certain composite material parts can be made, composite tensile strength and modulus are important factors.

The tensile strength of a composite material is largely dictated by the properties of the reinforcing fibre and the fibre-resin volume ratio. In addition, composites which are in tension tend to fail through a mechanism of accumulated damage arising from multiple tensile breakages of the individual tow filaments in the reinforcement. Once the stress levels in the resin adjacent to the broken filament ends becomes too great, the whole composite can fail. Therefore, fibre strength, the strength of the matrix, and the efficiency of stress dissipation in the vicinity of broken filament ends will contribute to the tensile strength of a composite material.

In many applications, it is desirable to maximise the tensile strength property of the composite material. However, attempts to maximise tensile strength can often result in negative effects in respect of other desirable properties, such as the compression performance and damage tolerance of the composite material.

The most common method of increasing composite tensile performance is to change the surface of the fibre in order to weaken the strength of the bond between matrix and fibre. This can be achieved by reducing the amount of electro-oxidative surface treatment of the fibre after graphitisation. Reducing the matrix fibre bond strength introduces a mechanism for stress dissipation at the exposed filament ends by interfacial debonding, which provides an increase to the amount of tensile damage a composite can withstand before failing in tension.

Alternatively, a coating or 'size' can be applied to the fibre which lowers resin-fibre bond strength. This approach is well known in glass fibre composites, but can also be applied to carbon reinforced composites. Using these strategies, it is possible to achieve significant increases in tensile strength. However, unfortunately the improvements are accompanied by a decrease in properties such as compression after impact (CAI) strength, which requires a high matrix-fibre bond strength.

An alternative approach is to use a lower modulus matrix. Having a low modulus resin reduces the level of stress which builds up in the immediate vicinity of broken filaments. This is usually achieved by either selecting resins with an intrinsically lower modulus (e.g. cyanate esters), or by incorporating an ingredient such as an elastomer (carboxy-terminated butadiene-acrylonitrile [CTBN], amine-terminated butadiene-acrylonitrile [ATBN] etc). Combinations of these various approaches are also known.

Selecting lower modulus resins can be effective in increasing composite tensile strength. However, this can result in a tendency to decrease compressive properties which require a stiff resin, such as open hole compression strength or 0°-compression strength.

The present invention seeks to provide a composite material which has improved physical properties, such a tensile strength and CAI strength, in comparison to prior attempts as described herein. The present invention further seeks to provide a method of making the composite material having improved physical properties.

The present invention also seeks to improve tensile strength without causing substantial negative impacts upon other physical characteristics of the composite material.

According to a first aspect of the present invention there is provided a composite material comprising at least one polymeric resin and optionally at least one fibrous reinforcement, wherein the polymeric resin comprises;

at least one difunctional epoxy resin; and at least one epoxy resin with a functionality greater than two having at least one meta-substituted phenyl ring in its backbone.

According to a second aspect of the present invention there is provided a method of making a composite material comprising the steps of;

providing a polymeric resin and at least one fibrous reinforcement; and applying the polymeric resin to the fibrous reinforcement; wherein the polymeric resin comprises at least one difunctional epoxy resin, and at least one epoxy resin with a functionality greater than two having at least one meta-substituted phenyl ring in its backbone.

According to a third aspect of the present invention there is provided a polymeric resin, wherein the polymeric resin comprises;

at least one difunctional epoxy resin; and at least one epoxy resin with a functionality greater than two having at least one meta-substituted phenyl ring in its backbone.

It has been found that the selection and combination of the components of the present invention results in a composite material which has improved tensile strength and CAI strength in comparison to conventional systems.

Additionally, it has surprisingly been found that the benefits of improved tensile strength and CAI strength can be obtained without substantially affecting the other desirable physical properties of the resultant composite material (for example matrix-fibre bonding, damage tolerance, stress dissipation, compression performance etc.).

The observed increase in both CAI and tensile strength is surprising and forms a basis of this invention.

Specifically, the use of a epoxy resin with a functionality greater than two having at least one meta-substituted phenyl ring in its backbone in place of the para-substituted glycidyl amine resins, conventionally used in aerospace prepreg matrices, imparts greater toughness to the composite material, as well as increasing the base resin modulus. This gives rise to a step change in the CAI performance. Surprisingly, the selected resins of the present invention also impart very high tensile strength to the composite material. Without wishing to be unduly bound by theory, it has been postulated that the benefits of the invention are conferred due to the greater translation characteristics.

The term polymeric resin as used herein refers to a polymeric system.

The term "polymeric resin" and "polymeric system" are used interchangeably in the present application, and are understood to refer to mixtures of chain lengths of resins having varying chain lengths. The term polymeric therefore includes an embodiment where the resins present are in the form of a resin mixture comprising any of monomers, dimers, trimers, or epoxy resin having chain length greater than 3. The resulting polymeric resin when cured forms a crosslinked matrix of resin.

The polymeric resin may therefore be composed of 50-90 wt. % resin in the form of monomer, 30-5 wt. % in the form of a dimer, 20-0.5 wt. % in the form of a trimer, and less than 20 wt. % in the form of polymers of chain length greater than 3.

The difunctional epoxy resin may be any suitable difunctional epoxy resin. It will be understood that this would include any suitable epoxy resins having two epoxy functional groups.

The difunctional epoxy resin may be saturated, unsaturated, cylcoaliphatic, aromatic, alicyclic, or heterocyclic.

Difunctional epoxy resins, by way of example, include those based on; diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

The difunctional epoxy resin may be preferably selected from diglycidyl ether of Bisphenol F, diglycidyl ether of Bisphenol A, diglycidyl dihydroxy naphthalene, or any combination thereof.

Most preferred is diglycidyl ether of Bisphenol F.

Diglycidyl ether of Bisphenol F is available commercially from Huntsman Advanced Materials under the trade names Araldite GY281 and GY285. Other examples of suitable commercially available difunctional epoxy resins include Epikote and Epon which are diglycidyl ethers of Bisphenol A and F, and are available commercially from Hexion Specialty Chemicals of Columbus, USA.

The difunctional epoxy resin may be used alone or in any suitable combination.

The difunctional epoxy resin may be present in the range 80 wt % to 0.1 wt % of the composite material. More preferably, the difunctional epoxy resin is present in the range 70 wt % to 0.1 wt %. Most preferably, the difunctional epoxy resin is present in the range 40 wt % to 10 wt %.

The difunctional epoxy resin may be applied to the fibrous reinforcement. The fibrous reinforcement may be fully or partially impregnated by the difunctional epoxy resin. In an alternate embodiment, the difunctional epoxy resin may be a separate layer which is proximal to, and in contact with, the fibrous reinforcement, but does not substantially impregnate said fibrous reinforcement.

The epoxy resin with a functionality greater than two is a compound comprising at least one meta-substituted phenyl ring in its backbone. The epoxy resin may be any suitable epoxy resin that comprises at least one meta-substituted phenyl ring in its backbone. It will be understood that this would include epoxy resins having an epoxy group functionality greater than two.

Preferred epoxy resin components are those which are trifunctional and tetrafunctional. Most preferably, the epoxy resin components are those which are trifunctional.

A trifunctional epoxy resin will be understood as having three epoxy groups substituted either directly or indirectly in a meta orientation on the phenyl ring in the backbone of the compound.

A tetrafunctional epoxy resin will be understood as having four epoxy groups substituted either directly or indirectly in a meta orientation on the phenyl ring in the backbone of the compound.

It is also envisaged that the phenyl ring may be substituted by other suitable non epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. The non epoxy substituent groups may be straight, branched, cyclic, or polycylic substituents.

Suitable non-epoxy substituent groups may be bonded to the phenyl ring at the para or ortho positions, or bonded at a meta position not occupied by an epoxy group.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals).

Suitable trifunctional epoxy resins, by way of example, may include those based upon phenol and cresol epoxy novolacs, glycidyl ethers of phenol-aldelyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

The trifunctional epoxy resin may be triglycidyl meta aminophenol.

Triglycidyl meta aminophenol is available commercially from Huntsman Advanced Materials under the trade name Araldite MY0600, and from Sumitomo under the trade name ELM-120.

The epoxy resin with a functionality greater than two having at least one meta-substituted phenyl ring in its backbone may be present in the range 80 wt % to 5 wt % of the composite material. More preferably, the epoxy resin is present in the range 75 wt % to 5 wt %. Most preferably, the epoxy resin is present in the range 40 wt % to 10 wt %.

The epoxy resin with a functionality greater than two having at least one meta-substituted phenyl ring in its backbone may be applied to the fibrous reinforcement.

It will be understood that references to meta substituted epoxy resin refers to those having a configuration about a phenyl ring in the resin as shown in FIG. 1.

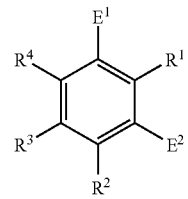

FIG. 1

Where $R^1$, $R^2$, $R^3$, and $R^4$ represent suitable non epoxy substituent groups substituted on the phenyl ring. Suitable non epoxy substituent groups are as listed hereinbefore. The non epoxy substituents $R^1$, $R^2$, $R^3$, and $R^4$ may be the same or independently selected.

Where $E^1$ and $E^2$ represent the epoxy backbone in which the groups $E^1$ and $E^2$ are terminated or comprise an epoxy group.

$R^1$, $R^2$, $R^3$, and $R^4$ may also represent further epoxy groups in the embodiment where more than two epoxy groups are bonded directly to the phenyl ring. In this embodiment, it will be understood that the term meta substituted epoxy resin refers to at least two of the epoxy groups $E^1$ and $E^2$ being bonded to the phenyl ring in a meta configuration with reference to one another.

The fibrous reinforcement may be fully or partially impregnated by the epoxy resin. In an alternate embodiment, the epoxy resin may be a separate layer which is proximal to, and in contact with, the fibrous reinforcement, but does not substantially impregnate said fibrous reinforcement.

The fibrous reinforcement of the composite material may be selected from any fibrous material, including hybrid or mixed fibre systems which comprise synthetic or natural fibres, or a combination thereof. The fibrous reinforcement may preferably be selected from any suitable material such as fibreglass, carbon or aramid (aromatic polyamide) fibres.

The fibrous reinforcement is most preferably carbon fibres.

The fibrous reinforcement may comprise cracked (i.e. stretch-broken) or selectively discontinuous fibres, or continuous fibres. It is envisaged that use of cracked or selectively discontinuous fibres may facilitate lay-up of the composite material prior to being fully cured, and improve its capability of being shaped.

The fibrous reinforcement may be in a woven, non-crimped, non-woven, unidirectional, or multiaxial textile structure form.

The woven form may be selected from a plain, satin, or twill weave style. The non-crimped and multiaxial forms may have a number of plies and fibre orientations.

Such styles and forms are well known in the composite reinforcement field, and are commercially available from a number of companies, including Hexcel Reinforcements of Villeurbanne, France.

The composite material may include at least one additional multifunctional epoxy resin.

The additional multifunctional epoxy resin is a resin which has an epoxy functionality of at least three, and is which does not have a phenyl ring in the backbone having meta substituted epoxy groups.

The multifunctional epoxy resin may be saturated, unsaturated, cylcoaliphatic, aromatic, alicyclic, or heterocyclic.

Suitable multifunctional epoxy resins, by way of example, include those based upon phenol and cresol epoxy novolacs, glycidyl ethers of phenol-aldelyde adducts, glycidyl ethers of dialiphatic diols, diethylene glycol diglycidyl ether, aromatic epoxy resins, dialiphatic triglycidyl ethers, aliphatic polyglycidyl ethers, epoxidised olefins, brominated resins, aromatic glycidyl amines, triglycidyl amino phenols, heterocyclic glycidyl imidines and amides, glycidyl ethers, fluorinated epoxy resins, or any combination thereof.

Specific examples of suitable multifunctional epoxy resin include, by way of example, N,N,N',N'-tetraglycidyl-4,4'-diaminodiphenyl methane (TGDDM available commercially as Araldite MY720 and MY721 from Huntsman Advanced Materials, or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials).

Other suitable multifunctional epoxy resins include those based upon phenol novolacs such as DEN 438 (from Dow Chemicals), DEN 439 (from Dow Chemicals), or cresol novolacs such as Araldite ECN 1273 (from Huntsman Advanced Materials), and Araldite ECN 1299 (from Huntsman Advanced Materials).

The multifunctional epoxy resins may be used alone or in any suitable combination.

The multifunctional epoxy resin, if present, may be present in the range 80 wt % to 0.1 wt % of the composite material. More preferably, the multifunctional epoxy resin may be present in the range 70 wt % to 0.1 wt %. Most preferably, the multifunctional epoxy resin may be present in the range 40 wt % to 5 wt %.

The multifunctional epoxy resin may be applied to the fibrous reinforcement. The fibrous reinforcement may be fully or partially impregnated by the multifunctional epoxy resin. In an alternate embodiment, the multifunctional epoxy resin may be a separate layer which is proximal to, and in contact with, the fibrous reinforcement, but does not substantially impregnate said fibrous reinforcement.

The composite material may include insoluble thermoplastic particles.

The term 'insoluble thermoplastic particles' includes any suitable material which is plastic and in a powder form, atomised form, or particle form, prior to curing, and substantially insoluble in the resin composition.

The term "particles" also includes fibres, flakes, rods, any other three-dimensional particles, or any combination thereof.

The particles may have any suitable shapes including, by way of example, fibrous, spherical, ellipsoidal, spheroidal, discoidal, dendritic, rods, discs, acicular, cuboid or polyhedral.

The insoluble thermoplastic particles may have well defined geometries or may be irregular in shape.

The insoluble thermoplastic particles may have a size dispersion with at least 80% of the particles having a size in the range 1 µm to 100 µm. Preferably, with at least 80% of the additives having a size in the range 5 µm to 70 µm. Most preferably, with at 80% of the additives having a sized in the range 8 µm to 60 µm.

The insoluble thermoplastic particles may be polymers, which may be homopolymers, block copolymers, graft copolymers, or terpolymers.

The insoluble thermoplastic particles may be thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties.

The insoluble thermoplastic particles can also have a partially crosslinked structure. The particles may be either crystalline or amorphous or partially crystalline.

Suitable examples of insoluble thermoplastic particles include, by way of example, polyamides, polycarbonates, polyacetal, polyphenylene oxide, polyphenylene sulphide, polyarylates, polyacrylates, polyethers, polyesters, polyimides, polyamidoimides, polyether imides, polysulphones, polyurethanes, polyether sulphones, and polyether ketones.

The insoluble thermoplastic particles may be selected from polyamides.

It will be understood that the insoluble thermoplastic particles selected from polyamides may be insoluble throughout the process of making the composite material, and may be present in the interleaf area of the composite material.

The insoluble thermoplastic particles may be chosen, by way of example, from polyamide 6 (caprolactame—PA6), polyamide 12 (laurolactame—PA12), polyamide 11, polyurethane, polymethyl methacrylate, crosslinked polymethyl methacrylate, densified polyethylene sulphone, or any combination thereof.

Preferably, the insoluble thermoplastic particles are selected from the following, either alone or in combination, polyamide 6, polyamide 12, polyamide 11, or any combination thereof.

Suitable insoluble thermoplastic particles include commercially available polyamide powders from Arkema of France under the trade name Orgasol.

The insoluble thermoplastic particle, if present, may be present in the range 35 wt % to 0 wt % of the composite material. Preferably, the insoluble thermoplastic particle may be present in the range 35 wt. % to 0.1 wt. %. More preferably, the insoluble thermoplastic particle may be present in the range 20 wt % to 5 wt %. Most preferably, the insoluble thermoplastic particle may be present in the range 15 wt % to 5 wt %.

Without wishing to be bound by theory, it is thought that improvements in damage tolerance and in open hole tensile strength were achieved by using different grades of insoluble thermoplastic particles and mixtures thereof.

The insoluble thermoplastic particles may comprise a copolymer blend of PA12 and PA6. The copolymer blend may comprise PA6 in the range from 10 wt. % to 90 wt. %, and PA12 in the range from 90 wt. % to 10 wt. %.

By using a copolymer of PA6 and PA12, it is possible to obtain low modulus interleave without affecting the modulus of the base resin, and additionally without compromising the overall water resistance of the composite under wet conditions to the effects of humidity.

The behaviour of the copolymer of PA6 and PA12 is different in comparison with the standard PA6 grade due to their low melting points. These particles will melt during cure and reform during cooling down. The copolymer has a low level of crystallinity, and induces a higher toughness improvement, which can be explained by a higher level of crack pinning. The copolymers will deform in shear just below the ILSS (Interlaminar Shear Strength) of the main resin so the shear fracture will be delayed in the adjacent plies.

The addition of insoluble thermoplastic particles acts to increase CAI performance of the composite material. To further increase the CAI performance of the composite material, the standard Orgasol (Orgasol 1002 DNAT1) was replaced by different Orgasol grades. The grades selected were copolymers PA6 with PA12 with lower melting point in comparison with the $T_g$ (glass transition temperature) of the resin. These grades have low level of crystallinity, and will melt during the curing cycle and reform in larger domains after cure in the interleave. This process will generate a smoother and more gradual interface in comparison with the interface created with Orgasol 1002 grade which is not affected by the curing cycle. Orgasol 1002 DNAT 1 is a PA6 with a melting point of 217° C. These alternative grades can affect the toughness of the interleave.

Suitable specific insoluble thermoplastic particles include, by way of example, the following:
  Orgasol 3502 D NAT 1 (copolymer of 50% PA12 and 50% PA 6) with a melting point of 142° C., particle size 20 microns
  Development grade Orgasol CG199 (copolymer of 80% PA12 and 20% PA6) with a melting point of 160° C., particle size 20 microns and lower molecular weight in comparison with commercial grades such as Orgasol 1002 DNAT1
  Orgasol 3801 DNAT1 (copolymer of PA12 and PA6) with a melting point of 160° C., particle size 20 microns and higher molecular weight than CG199 and comparable with the Orgasol 1002 DNAT1
  Orgasol 1002 D NAT1 (100% PA6) with a melting point of 217° C., particle size 20 microns These insoluble thermoplastic particle Orgasol grades may be used by themselves or in any combination.

The composite material may include at least one curing agent.

The curing agents of the invention are those which facilitate the curing of the epoxy-functional compounds of the invention, and, particularly, facilitate the ring opening polymerisation of such epoxy compounds; in a particularly preferred embodiment, such curing agents include those compounds which polymerise with the epoxy-functional compound or compounds, in the ring opening polymerisation thereof.

Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylenetetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diaminodiphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS).

Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, commercially available as CG-125, from Ajinomoto USA Inc., Teaneck, N.J., is also suitable.

Yet further suitable resins containing phenolic groups can be used, such as resorcinol based resins, and resins formed by cationic polymerisation, such as DCPD—phenol copolymers. Still additional suitable resins are melamine-formaldehyde resins, and urea-formaldehyde resins.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) are selected such that they provide curing of the resin component of the composite material when combined therewith at suitable temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman.

The curing agent, if present, may be present in the range 45 wt % to 5 wt % of the composite material. More preferably, the curing agent may be present in the range 30 wt % to 10 wt %. Most preferably, the curing agent may be present in the range 25 wt % to 15 wt %.

The composite material may also include additional ingredients such as performance enhancing or modifying agents. The performance enhancing or modifying agents, for example, may be selected from flexibilisers, toughening agents/particles, accelerators, thermoplastic polymers and core shell rubbers, flame retardants, wetting agents, pigments/dyes, UV absorbers, anti-fungal compounds, fillers, conducting particles, and viscosity modifiers.

The composite material may also comprise an accelerator which is typically a urone. Suitable accelerators, which may be used alone or in combination include N,N-dimethyl, N'-3,4-dichlorphenyl urea (Diuron), N'-3-chlorophenyl urea (Monuron), and preferably N,N-(4-methyl-m-phenylene bis [N',N'-dimethylurea] (UR500).

Any suitable thermoplastic polymers may be used. Suitable thermoplastic polymers for use with the present invention include any of the following either alone or in combination: polyether sulphone (PES), polyether ethersulphone (PEES), polyphenyl sulphone, polysulphone, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO.

Toughening agents/particles may include, by way of example, any of the following either alone or in combination: polyamides, copolyamides, polyimides, aramids, polyketones, polyetheretherketones, polyesters, polyurethanes, polysulphones, high performance hydrocarbon polymers, liquid crystal polymers, PTFE, elastomers, and segmented elastomers.

Other suitable toughening agents/particles may include polycarbonates, polyacetal, polyphenylene oxide, polyphenylene sulphide, polyarylates, polyacrylates, polyesters, polyethers, polyamidoimides, polyether imides, polyether sulphones, and polyether ketones.

The toughening agents/particles may be formed from polymers, which may be homopolymers, block copolymers, graft copolymers, or terpolymers.

The toughening agents/particles may be formed from thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties.

The toughening agents/particles can also have a partially crosslinked structure. The structure may be either crystalline or amorphous or partially crystalline.

Toughening agents/particles, if present, may be present in the range 45 wt % to 0 wt % of the composite material. More preferably, the toughening particles may be present in the range 25 wt % to 5 wt %. Most preferably, the toughening particles may be present in the range 15 wt % to 10 wt %.

A suitable toughening agent/particle, by way of example, is Sumikaexcel 5003P, which is commercially available from Sumitomo Chemicals. Alternatives to 5003P are Solvay polysulphone 105P, or the non-hydroxyl terminated grades such as Solvay 104P.

Without wishing to be bound by theory, it is postulated that the toughening toughening agents/particles if present dissolve in the resin, and upon curing phase separate. The toughening agents/particles are thought to improve base resin toughness.

Suitable fillers may include, by way of example, any of the following either alone or in combination: silicas, aluminas, titania, glass, calcium carbonate, and calcium oxide.

Suitable conducting particles, by way of example, may include any of the following either alone or in combination: silver, gold, copper, aluminium, nickel, conducting grades of carbon, buckminsterfullerene, carbon nanotubes and carbon nanofibres. Metal coated fillers may also be used, for example nickel coated carbon particles and silver coated copper particles.

The composite material may comprise an additional polymeric resin which is at least one thermoset resin.

The term 'thermoset resin' includes any suitable material which is plastic and usually liquid, powder, or malleable prior to curing and designed to be moulded in to a final form. Once cured, a thermoset resin is not suitable for melting and remoulding. Suitable thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins.

The thermoset resin may be applied to the fibrous reinforcement. The fibrous reinforcement may be fully or partially impregnated by the thermoset resin. In an alternate embodiment, the thermoset resin may be a separate layer which is proximal to, and in contact with, the fibrous reinforcement, but does not substantially impregnate said fibrous reinforcement.

It is understood that references to a composite material include materials which comprise a fibre reinforcement, where the polymeric resin is in contact with the fibre but not impregnated in the fibre. The term composite material also includes an alternative arrangement in which the resin is partially embedded or partially impregnated in the fibre, commonly known in the art as prepreg.

The composite material formed may be in the form of continuous tapes, towpregs, webs, or chopped lengths (chopping and slitting operations may be carried out at any point after impregnation). The composite material may be an adhesive or surfacing film and may additionally have embedded carriers in various forms both woven, knitted, and non-woven. The composite material may be fully or only partially impregnated, for example, to facilitate air removal during curing.

An example of a preferred composite material comprises between about 22 wt % and 25 wt % Bisphenol-F diglycidyl ether; between about 25 wt % and 30 wt % triglycidyl-m-aminophenol (trifunctional epoxy resin); between about 17 wt % and 15 wt % diaminodiphenylsulphone (either 3,3-DDS or 4,4-DDS as a curing agent); between about 10 wt % and 15 wt % insoluble thermoplastic particles, and between about 13 wt % and 17 wt % poly(ether sulphone) as a toughening agent.

The composite material of the invention may be fully or partially cured using any suitable temperature, pressure, and time conditions known in the art.

Thus, according to a fourth aspect of the present invention there is provided a method of making a cured composite material comprising the steps of the second aspect, and curing the composite material The curing step of the fourth aspect may be using any known method. Particularly preferred are curing methods as described herein.

The composite material may more preferably be cured using a method selected from UV-visible radiation, microwave radiation, electron beam, gamma radiation, or other suitable thermal or non-thermal radiation.

The improved composite materials of the present invention composites will find application in making articles such as numerous primary and secondary aerospace structures (wings, fuselage, bulkhead etc.), but will also be useful in many other high performance composite applications including automotive, rail and marine applications where high tensile strength, compressive strength, and resistance to impact damage are needed.

Thus, according to a fifth aspect of the present invention there is provided a process for preparing a cured composite material containing article comprising the steps of:
 making a cured composite material in accordance with the method of the fourth aspect; and
 using the cured composite material to produce an aerospace article.

The process of the fifth aspect may alternatively be a method of making a cured composite material comprising the same steps.

The curing step of the process or method of the fifth aspect may be any known method. Particularly preferred are curing methods as described herein.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

Primary structure composite material/prepreg performance is probably best represented by other formulations which combine a blend of difunctional and trifunctional para-substituted epoxy resins toughened by the addition of poly (ethersulphone) (Sumikaexcel 5003P PES) and cured by 4,4-diaminodiphenyl sulphone. Additional damage tolerance is imparted by the addition of PA6 (Nylon-6) microparticles which serve to stop cracks propagating through the interlaminar region.

Components used for the examples of the present invention typically include those listed in Table 1. The formulation of Table 1 does not comprise an epoxy resin with a functionality greater than two having at least one meta-substituted phenyl ring in its backbone. Therefore, the formulation of Table 1 does not fall within the scope of the invention and is included as a comparison only.

TABLE 1

Formulation of comparison composite material.

| Ingredient | Comment |
| --- | --- |
| GY 281 | Bisphenol-F diglycidyl ether |
| MY 0510 | Trirunctional glycidyl amine |
| MY 721 | Tetrafunctional glycidyl amine |
| 4,4'-DDS or 3,3'-DDS | Aromatic diamine curative |
| Sumikaexcel 5003P PES | Toughener |
| Orgasol 1002 DNAT 1 | Insoluble thermoplastic particles |

Effect of Formulation on Neat Resin Properties

Several formulations similar to the one shown in Table 1 were manufactured using MY 0600 (trifunctional epoxy resin with a meta substituted phenyl ring) in place of MY 0510 and MY 721 (non meta substituted multifunctional epoxy resins). These formulations were manufactured and tested to determine compression, and using a single-edged notch beam (SENB) tests to determine the resin fracture energy under mode I loading.

Additionally, the G1c (adhesive fracture energy) and modulus values for the composite materials made were determined. The methods used to determine these values were as follows:

The G1c value represents the mode 1 adhesive fracture energy, and is determined by SENB testing conducted according to American Society for Testing and Materials (ASTM) testing standard E 399.

The bulk modulus is determined by compression on bars of resin of dimensions 8 mm×16 mm×80 mm using the Boeing antibuckling jig apparatus and test method ASTM D695.

The results obtained are summarised below:

TABLE 2

Resin fracture energy of formulations of present invention.

| | Formulations of Present Invention | | | |
|---|---|---|---|---|
| Component | A | B | C | D |
| MY721 | 20.82 | | | |
| GY281 | 21.81 | 14.50 | 21.81 | 23.05 |
| MY0600 | 11.30 | 33.80 | 32.12 | 26.05 |
| PES 5003P | 13.81 | 14.00 | 13.81 | 15.00 |
| 4,4-DDS | 18.94 | 24.20 | 18.94 | 7.01 |
| 3,3-DDS | | | | 15.39 |
| Orgasol 1002 DNAT1 | 13.32 | 13.50 | 13.32 | 13.50 |
| Modulus (GPa) | 4.1 | 4.4 | 4.2 | 4.6 |
| Glc (J/m$^2$) | 320 | 351 | 387 | 446 |

All amounts of components in Table 2 are expressed in terms of wt. %.

The data in Table 2 shows that an increase of the meta-substituted resin (i.e. using MY 0600 instead of epoxy resins not containing at least one meta-substituted phenyl ring in its backbone) along with thermoplastic insoluble particles (Orgasol 1002), provides significant and surprising increases in neat resin toughness (G1c) at the same time as increasing resin modulus (related to open hole compression).

Further formulations comprising MY0600 were prepared, and these composite formulations are listed in Table 3.

TABLE 3

Formulations of composite materials of the present invention.

| | Batch No. | | | | | | |
|---|---|---|---|---|---|---|---|
| Component | 55012 | 55035 | 55035-1A | 1349 | 1351 | 65017 | 1312 |
| 4,4'-DDS | 11.20 | 9.33 | 11.20 | 18.66 | 18.66 | 22.40 | 7.01 |
| 3,3'-DDS | 11.20 | 9.33 | 11.20 | — | — | — | 15.39 |
| GY281 | 23.05 | 24.80 | 23.05 | 24.80 | 24.80 | 23.05 | 23.05 |
| MY0600 | 26.05 | 28.03 | 26.05 | 28.03 | 28.03 | 26.05 | 26.05 |
| PES | 15.00 | 15.00 | 15.00 | 15.00 | 15.00 | 15.00 | 15.00 |
| Orgasol 1002 | 13.50 | 13.50 | 13.50 | 13.50 | 13.50 | 13.50 | 13.50 |
| Total | 100 | 100 | 100 | 100 | 100 | 100 | 100 |

All the above formulations above used IM (intermediate modulus) fibre at 268 gsm.

All amounts of components in Table 3 are expressed in terms of wt. %.

The composite properties of the compositions shown in of Table 3 are listed in Table 4 and were determined as follows:

0° tensile modulus and strength were determined using a 4 ply unidirectional laminates made of 268 gsm fibre areal weight prepreg with 35% resin content in intermediate modulus fibre. The laminate was cured for 2 hours at 180° C. in an autoclave and gave a nominal thickness of 1 mm. Consolidation was verified by C-scan. The specimens were cut and tested in accordance with EN 2651. Results are normalised to 60% volume fractions based on nominal cure ply thickness in accordance with EM 3783.

90° tensile modulus and strength were determined using an 8 ply unidirectional laminate with 100/0/0 lay-up made of 268 gsm fibre areal weight prepreg with 35% resin content in intermediate modulus fibre. The laminate was cured for 2 hours at 180° C. in an autoclave and gave a nominal thickness of 2 mm. Consolidation was verified by C-scan. The specimens were cut and tested according to EN 2957. Results reported are actual strengths.

In-plane shear strength (IPS) and modulus were determined using an 8 ply unidirectional laminate with 0/100/0 lay-up made of 268 gsm fibre areal weight prepreg with 35% resin content in intermediate modulus fibre. The laminate was cured for 2 hours at 180° C. in an autoclave and gave a nominal thickness of 2 mm. Consolidation was verified by C-scan. The specimens were cut and tested according to AITM 1.0002. Results quoted are not normalised.

Interlaminar shear strength (ILSS) was determined using an 8-ply laminate made of 268 gsm fibre areal weight prepreg with 35% resin content and intermediate modulus fibre. The laminate was cured for 2 hours at 180° C. in an autoclave and gave a nominal thickness of 2 mm. Consolidation was verified by C-scan. The specimens were cut and tested in accordance with EN 2563. Results reported are actual strengths.

Cross-ply Interlaminar Shear Strength (X-PLY ILSS) was determined using and 8 ply laminate with lay-up of +45°/−45° made of 268 gsm fibre areal weight prepreg with 35% resin content and intermediate modulus fibre. The laminate was cured for 2 hours at 180° C. in an autoclave and gave a nominal thickness of 2 mm. Consolidation was verified by C-scan. The specimens were cut and test in accordance with EN 2563. Results reported are actual strengths.

Compression after Impact (CAI) was determined using the laminate in quasi isotropic lay-up, 16 plies of prepreg with 35% resin content with 25/50/25 lay-up and 268 gsm FAW (fibre area weight). The laminate is cured at 180° C. for 2 hours in the autoclave, final laminate thickness ~4 mm. The consolidation was verified by c-scan. The specimens were cut and tested in accordance with AITM 1.0010 issue 2, June 1994

Open hole compression (OHC) was determined using a 20 ply laminate with 40/40/20 lay-up made of 268 gsm fibre areal weight prepreg with 35% resin content in intermediate modulus fibre. The laminate was cured for 2 hours at 180° C. in an autoclave and gave a nominal thickness of 5 mm. Consolidation was verified by C-scan. The specimens were cut up and tested in accordance with Airbus test method AITM 1.0008. Results quoted are values normalised to 60% volume fraction based on nominal cure ply thickness with calculation carried out as per EN 3784 method B.

Open hole tensions (QHT) was determined using a 20 ply laminate with 40/40/20 lay-up made of 268 gsm fibre areal weight prepreg with 35% resin content in intermediate modulus fibre. The laminate was cured for 2 hours at 180° C. in an autoclave and gave a nominal thickness of 5 mm. Consolidation was verified by C-scan. The specimens were cut up and tested in accordance with Airbus test method AITM 1.0008. Results quoted are values normalised to 60% volume fraction based on nominal cure ply thickness with calculation carried out as per EN 3784 method B.

The test methods referred to as EN 2651, EM 3783, EN 2957, EN 2563, and EN 3784 are standardised tests used by Airbus Industries.

Only batch 1312 was tested as prepreg. The table simply serves to show that MY0600 increases toughness and modulus. The batch 1312 formulation tested uses mostly 3,3'-DDS and gives the highest modulus. It was expected that the batch 1312 formulation would give the best compression performance and selected it for testing on IM fibre.

Batch 1312 used a combination of 3,3'-DDS and 4,4'-DDS dominated by the more reactive 3,3'-DDS with stoicheometry of 97%.

Batches 55012 and 55035-1A: also used a combination of 3,3'-DDS and 4,4'-DDS (but equal amount of each) with amine:epoxy stoicheometry of ~97%.

Batch 55035 used the same combination of amines as 55012 but at lower stoicheometry (75%).

Batch 65017 used the only 4,4-DDS as the curative but still at 97% stoicheometry.

Using MY0600 instead of epoxy resins not containing at least one meta-substituted unsaturated phenyl ring in its backbone improves:
  Open hole compression (OHC) performance (see batches 55035-1A and 1351)
  In-plane shear strength
Using MY0600 instead of epoxy resins not containing at least one meta-substituted unsaturated phenyl ring in its backbone does not have a substantial negative impact upon:
  0°-tensile strength and modulus
  In-plane shear modulus
  ILSS at temperatures between −55° C. and 120° C.

The concurrent increase in OHT and CAI is surprising and constitutes the basis for this invention disclosure.

In the context of the criteria cited above as being of interest to primary structure composite applications, the specific formulations of the present invention provide similar benefits. However other additional factors may need to be taken into account when selecting a specific formulation for commercialisation. These additional factors include, for example, outlife and tack.

Additional Multifunctional Epoxy Resins

Further specific composite material formulations of the present invention were prepared which comprise additional multifunctional epoxy resins. These further formulations are shown in Table 5.

TABLE 4

Composite properties data for formulations of Table 3, all with fibre areal weight of 268 gsm and IM7 fibre type with modified surface treatment.

| Property | Units | Value | Batch | 55012 | 55035 | 55035-1A | 1349 | 1351 | 65017 | 1312 |
|---|---|---|---|---|---|---|---|---|---|---|
| 0°-tensile modulus | GPa | 22 | dry | 185 | 185 | 181 | 183 | 181 | 176 | 187 |
| 0°-tensile strength | MPa | 22 | dry | 2978 | 3119 | 3197 | 3030 | 2935 | 2875 | 3333 |
| 90°-tensile strength | MPa | 22 | dry | 44 | 64 | 60 | | | | |
| 90°-tensile modulus | GPa | 22 | dry | 9 | 9 | 9 | | | | |
| In-plane shear strength | MPa | 22 | dry | 103 | 97 | 97 | 90 | 114 | 106 | 92 |
| In-plane shear modulus | GPa | 22 | dry | 5.50 | 5.50 | 5.31 | 5.20 | 5.30 | 5.70 | 5.30 |
| ILSS | MPa | 22 | dry | 95 | 92 | 90 | 92 | 89 | 99 | 95 |
| ILSS | MPa | 70 | dry | 82 | 80 | 84 | 75 | 77 | | |
| ILSS | MPa | 90 | dry | 76 | 72 | | 69 | 72 | | |
| ILSS | MPa | 120 | dry | 64 | 61 | 63 | 59 | 61 | | 55 |
| ILSS | MPa | 70 | wet (eqm)* | 70 | 68 | | 71 | 72 | | |
| CAI (25J) | MPa | 22 | Dry | 286 | 277 | 287 | 284 | 297 | 295 | 270 |
| CAI 1 mm BVID | MPa | 22 | Dry | 188 | 209 | 226 | 225 | 227 | 208 | 206 |
| OHT | MPa | 22 | Dry | 823 | 797 | 818 | 768 | 827 | | 825 |
| OHC | MPa | 22 | Dry | 402 | 410 | 421 | 402 | 418 | 423 | 406 |
| OHC | MPa | 70 | wet (eqm)* | 292 | 310 | | | 324 | | |

The following observations for the composite material formulations of Tables 3 may be made based on the data in Table 4:

Using MY0600, a trifunctional epoxy resin having a meta substituted phenyl ring instead of epoxy resins not containing at least one meta-substituted unsaturated phenyl ring in its backbone gives tangible increases in:
  Open hole tensile strength (OHT)
  CAI at 25 J
  CAI at 1 mm barely visible impact damage (BVID) impact energy

TABLE 5

Formulations comprising additional multifunctional epoxy resins.

| | Batch/Material Designation | | | |
|---|---|---|---|---|
| Ingredient | HX1622 | HX1622-3 | HX1622-3A | HX1622-4 |
| Araldite MY721 | | | | 10.00 |
| Araldite MY0510 | | 7.77 | 7.36 | |
| Araldite MY0600 | 26.05 | 20.00 | 18.96 | 25.00 |

TABLE 5-continued

Formulations comprising additional multifunctional epoxy resins.

| | Batch/Material Designation | | | |
|---|---|---|---|---|
| Ingredient | HX1622 | HX1622-3 | HX1622-3A | HX1622-4 |
| Araldite GY281 | 23.05 | | | |
| Araldite GY285 | | 24.55 | 23.27 | 16.54 |
| PES | 15.00 | 15.00 | 15.00 | 15.00 |
| Orgasol 1002N | 13.50 | 13.50 | 13.50 | 13.50 |
| 4,4' DDS | 22.40 | 19.18 | 21.91 | 19.96 |

All amounts of components in Table 5 are expressed in terms of wt. %.

The composite physical properties of the formulations listed in table 5 are listed in Table 6. The composite physical properties were determined as follows:

All materials were tested per BMS8-276, which is the Boeing test method for primary structure composite materials. The BMS 8-276 is similar to the Airbus standard AIMS 05-01-002 which cites many of the Airbus Industries Test Methods (AITM) used for generation of the text data, but uses different test methods, and also different lay-up and sample dimensions.

The composite properties were generated using 268 gsm fibre areal weight prepreg with a resin content of 35%.

TABLE 6 mechanical data for formulations of Table 5.

| Material Designation | HX1622 | | HX1622-3 | HX1622-3A | | | HX1622-4 | |
|---|---|---|---|---|---|---|---|---|
| Fibre Type | IM7 | IM7 mod | IM7 | IM8 | IM7 | AS7 | IM8 | IM7 |
| OHT Strength RT (MPa) | 510 | 518 | 503 | 516 | 504 | 400 | 483 | 516 |
| CAI | 346 | 296 | 363 | 347 | 332 | 311 | 337 | 323 |

TABLE 6-continued mechanical data for formulations of Table 5.

| Material Designation | HX1622 | HX1622-3 | HX1622-3A | HX1622-4 |
|---|---|---|---|---|
| Strength (Cl.1) in-lb (MPa) | | | | |

It should be noted that IM7 fibre is IM fibre with a lower surface treatment level.

Insoluble Thermoplastic Particles

By using different interleave particles, performance can be further enhanced by further selection of insoluble thermoplastic particles.

The development continued to improve the hot/wet performance of 3502 and 1002 combination, and by using a higher molecular grade of CG199 called 3801 DNAT1, both described hereinbefore. The formulations which were prepared are detailed in Table 7.

TABLE 7

Formulations for different interleave particles (Orgasol grades).

| Component | Batch 1349 & 1351 | Batch 1350 & 1352 | Batch 1347 | Batch 1348 | Batch 1369 |
|---|---|---|---|---|---|
| GY281 | 24.80 | 24.80 | 24.80 | 24.80 | 26.19 |
| MY0600 | 28.03 | 28.03 | 28.03 | 28.03 | 29.6 |
| PES 5003P | 15.00 | 15.00 | 15.00 | 15.00 | 15.00 |
| 4,4'-DDS | 18.66 | 18.66 | 18.66 | 18.66 | 19.70 |
| Orgasol 1002 DNAT1 | 13.50 | 6.75 | | | 4.75 |
| Orgasol 3502 DNAT1 | | 6.75 | 13.5 | | 4.75 |
| CG 199 Development grade | | | | 13.5 | |

All amounts of components in Table 7 are expressed in terms of wt. %.

Table 8 shows the composite physical properties for the composites of Table 7. The values contained in Table 8 were calculated and determined as discussed previously with reference to Table 4.

TABLE 8

Composite physical properties on IM7 fibre with surface modified treatment, 35% resin content, FAW 268 gsm

| Test | TstTemp | Batch 1349-1351# | Batch 1352 (3502/1002) | Batch 1347 (3502) | Batch 1348 (CG199) |
|---|---|---|---|---|---|
| 0° Tensile Strength MPa (dry) | RT/dry | 3310-3350 | 3086 | | |
| 0° Tensile Modulus GPa (dry) | RT/dry | 186-196 | 181 | | |
| | 70° C./wet | | | | |
| | 70° C./wet | | | | |
| ILSS MPa | RT/dry | 94.6 | 85 | 88 | 71.5 |
| | 70° C. | 82.2 | 75 | 69.2 | 61.1 |
| | 90° C. | 75.5 | 69 | 59.4 | 56 |
| | 120° C. | 64 | 56 | 45.8 | 48.8 |
| | Wet 70° C. | 69.9 | 67 | 51 | |
| IPS Strength, MPa | RT/dry | 103 | 116 | 100.2 | 70 |
| IPS Modulus, GPa | RT/dry | 5.5 | 5.0 | 4.59 | 4.31 |
| Open Hole Tensile Strength MPa (lay up 40/40/20) | RT/dry | 823 | 831 | 814 | 1070 |
| Open Hole Compression Strength MPa (lay up 40/40/20) | RT/dry | 402 | 415 | 394 | 393 |
| | 70° C./wet | 292 | 280 | 252 | 274 |

TABLE 8-continued

Composite physical properties on IM7 fibre with surface modified treatment, 35% resin content, FAW 268 gsm

| Test | TstTemp | Batch 1349-1351# | Batch 1352 (3502/1002) | Batch 1347 (3502) | Batch 1348 (CG199) |
|---|---|---|---|---|---|
| CAI MPa after 25J impact | RT/dry | 286-293 | 340 | 307.6 | 243 |
| 30J | | 274-289 | | 281 | 222.45 |
| 40J | | 226-255 | | 245.6 | 176 |
| 1 mm BVID | | 185-188 | 237 | 202 | Not reached |

The range data was obtained using batches 1349 and 1351.

The following observations can be made from the data of Table 8:

Using Orgasol 3502 in combination with Orgasol 1002 gives tangible increases in:
  CAI at 25 J
  CAI at 1 mm barely visible impact damage (BVID) impact energy
  OHT
The combination Orgasol 3502 with 1002 works better in comparison with 3502 as single grade:
  A reduction in ILSS and hot/wet OHC were recorded
Using Orgasol CG 199 in place of Orgasol 1002 had an unexpected effect on OHT:
  A high OHT value recorded for this grade
  Low CAI values were recorded due to lower particle's molecular weight A further compositions using a combination of PA-particles as interleaf was prepared and is listed in Table 9.

TABLE 9

Composite material formulation with different Orgasol combinations.

| Component | Batch 1368 |
|---|---|
| 4,4'-DDS | 18.66% |
| GY281 | 24.81% |
| MY0600 | 28.03% |
| 5003P PES | 15.00% |
| Orgasol 1002 | 6.75% |
| Orgasol 3801 DNAT1 | 6.75% |
| Total wt % | 100% |

The formulation listed in Table 9 was then used along with the formulations listed in Table 7 (i.e. Batches 1347, 1348, 1350, 1352, and 1369), and the physical properties of these composites were determined. The physical properties are listed in Table 10.

The composite physical properties in Table 10 were determined using the same methods as described with reference to Table 4.

TABLE 10

Composite physical property results for formulations of Table 9 and 4.

| | | | | Fibre | | | | | |
|---|---|---|---|---|---|---|---|---|---|
| | | | | T800S | IM7 with modified surface treatment | | | | |
| | | | | FAW (gsm) | | | | | |
| | | | | 268 | 268 | 268 | 268 | 268 | 268 | 268 |
| | | | | Resin content % | | | | | |
| | | | | 35% T800 | 35% | 35% | 35% | 35% | 35% | 35% |
| Test | Unit | Test Temp (° C.) | Batch | Qual | 1347 | 1348 | 1350 | 1352 | 1369 | 1368 |
| 0°-tensile modulus | GPa | 22 | dry | 169 | — | — | 181 | 181 | — | — |
| 0°-tensile Strength | MPa | 22 | dry | 2845 | — | — | 3089 | 3086 | — | — |
| In-plane shear strength | MPa | 22 | dry | 78.2 | 100.2 | 70 | 103 | 116 | 117 | 97 |
| In-plane shear modulus | GPa | 22 | dry | 4.98 | 4.59 | 4.31 | 5.00 | 5.00 | 4.90 | 4.90 |
| ILSS | MPa | 22 | dry | 90.1 | 88 | 71.5 | 91 | 85 | 94 | 84 |
| ILSS | MPa | 70 | dry | | 69.2 | 61.1 | 73 | 75 | — | 84 |
| ILSS | MPa | 90 | dry | 70.3 | 59.4 | 56 | 67 | 69 | 72 | 60 |
| ILSS | MPa | 120 | dry | 60.5 | 54.8 | 48.8 | 53 | 56 | 61 | 52 |
| ILSS | MPa | 70 | wet (eqm)* | 65 | 51 | | 67 | 67 | 62 | 58 |
| CAI (25J) | MPa | 22 | dry | 253 | 308 | 243 | 296 | 340 | 333 | 326 |
| CAI (30J) | | | | | 281 | 222 | — | — | — | — |
| CAI (40J) | | | | | 246 | 176 | — | — | — | — |
| CAI 1 mm BVID | MPa | 22 | dry | 0 | 202 | not reached | 238 | 237 | | 233 |
| OHT | MPa | 22 | dry | 713 | 814 | 1070 | 817 | 831 | — | — |
| OHC | MPa | 22 | dry | 383 | 394 | 393 | 394 | 415 | 399 | 375 |
| OHC | MPa | 70 | wet (eqm)* | 328 | 252 | 274 | 287 | 280 | 290 | 292 |

Table 10 shows that a preferred composite would comprise thermoplastic particles Orgasol 3801 DNAT1 in combination with Orgasol 1002 (standard grade). This provided a better hot/wet retention and ILSS performance without a negative impact on the other mechanical characteristics.

It is to be understood that the invention is not to be limited to the details of the above embodiments, which are described by way of example only. Many variations are possible.

The invention claimed is:

1. A composite material comprising at least one polymeric resin composition which is curable at a curing temperature and at least one fibrous reinforcement, wherein the polymeric resin composition comprises:
   between about 22 weight percent and 25 weight percent, based on the overall resin composition, of bisphenol-F-diglycidyl ether;
   between about 25 weight percent and 30 weight percent, based on the overall resin composition, of triglycidyl-m-aminophenol;
   between about 10 weight percent and 15 weight percent, based on the overall resin composition, of insoluble thermoplastic particles consisting essentially of equal weight amounts of particles consisting essentially of polyamide 6 and particles consisting essentially of a copolymer of polyamide 6 and polyamide 12;
   between about 13 weight percent and 17 weight percent, based on the overall resin composition, of polyethersulfone; and
   a sufficient amount of a curing agent consisting essentially of an aromatic diamine hardener, to cure said polymeric resin composition at said curing temperature.

2. The composite material according to claim 1, wherein the fibrous reinforcement is selected from hybrid and mixed fibre systems which comprise synthetic fibers, natural fibres, or combinations thereof.

3. The composite material according to claim 2, wherein the fibrous reinforcement comprises at least one of fiberglass, carbon fibres, and aromatic polyamide fibres.

4. The composite material according to claim 1, wherein the curing agent consists essentially of 4,4'-diaminodiphenyl sulphone and/or 3,3'-diaminodiphenyl sulphone.

5. The composite material according to claim 4 wherein said curing agent is present in an amount of between about 15 weight percent and 17 weight percent, based on the overall resin composition.

6. The composite material according to claim 4 wherein said curing agent consists essentially of 4,4'-diaminodiphenyl sulphone.

7. The composite material according to claim 1, wherein the composite material further comprises at least one additional ingredient selected from flexibilisers, accelerators, thermoplastic polymers and core shell rubbers, flame retardants, wetting agents, pigments/dyes, UV absorbers, antifungal compounds, fillers, and conducting particles.

8. The composite material according to claim 7 wherein said conducting particles are selected from: silver, gold, copper, aluminum, nickel, conducting grades of carbon, buckminsterfullerene, carbon nanotubes, carbon nanofibers, nickel coated carbon particles, and silver coated copper particles.

9. A polymeric resin composition which is curable at a curing temperature, wherein the polymeric resin composition comprises:
   between about 22 weight percent and 25 weight percent, based on the overall resin composition, of bisphenol-F-diglycidyl ether;
   between about 25 weight percent and 30 weight percent, based on the overall resin composition, of triglycidyl-m-aminophenol;
   between about 10 weight percent and 15 weight percent, based on the overall resin composition, of insoluble thermoplastic particles consisting essentially of equal weight amounts of particles consisting essentially of polyamide 6 and particles consisting essentially of a copolymer of polyamide 6 and polyamide 12;
   between about 13 weight percent and 17 weight percent, based on the overall resin composition, of polyethersulfone; and
   a sufficient amount of a curing agent consisting essentially of an aromatic diamine hardener, to cure said polymeric resin composition at said curing temperature.

10. The polymeric resin composition according to claim 9 wherein said curing agent is present in an amount of between about 15 weight percent and 17, based on the overall resin composition.

11. The polymeric resin composition according to claim 9 wherein said curing agent consists essentially of 4,4'-diaminodiphenyl sulphone.

12. A method of making a composite material comprising the steps of:
   providing the polymeric resin composition according to claim 9 and at least one fibrous reinforcement; and
   applying the polymeric resin composition to the fibrous reinforcement.

13. A method of making a cured composite material comprising the steps of:
   providing the polymeric resin composition according to claim 9 and at least one fibrous reinforcement;
   combining the polymeric resin composition and the fibrous reinforcement to form a composite material; and
   curing the composite material.

14. A method of making an aerospace article comprising the steps of:
   making a cured composite material in accordance with the method of claim 13; and
   manufacturing an aerospace article with the cured composite material.

* * * * *